United States Patent [19]

Best

[11] Patent Number: 4,645,750

[45] Date of Patent: Feb. 24, 1987

[54] UREA REJUVENATION OF CATALYSTS

[75] Inventor: Donald F. Best, Mahopac, N.Y.

[73] Assignee: Union Caride Corporation, Danbury, Conn.

[21] Appl. No.: 790,653

[22] Filed: Oct. 24, 1985

Related U.S. Application Data

[63] Continuation of Ser. No. 642,747, Aug. 21, 1984, abandoned, which is a continuation of Ser. No. 250,568, Apr. 3, 1981, abandoned.

[51] Int. Cl.$^4$ .......................... B01J 29/38; B01J 38/66; B01J 23/96; C10G 47/02
[52] U.S. Cl. ...................................... 502/26; 208/111; 502/38
[58] Field of Search .................... 502/26, 38; 208/111

[56] References Cited

U.S. PATENT DOCUMENTS

| | | | |
|---|---|---|---|
| 3,637,529 | 1/1972 | Van Beek et al. | 252/454 |
| 3,692,692 | 9/1972 | Ward et al. | 252/412 |
| 3,835,028 | 9/1974 | Ward et al. | 208/111 |
| 3,988,260 | 10/1976 | Weber et al. | 252/416 |
| 4,055,482 | 10/1977 | Robson | 252/412 |
| 4,107,031 | 8/1978 | Ward | 208/111 |
| 4,139,433 | 2/1979 | Ward | 208/111 |
| 4,148,750 | 4/1979 | Pine | 252/416 |
| 4,190,553 | 2/1980 | Ward | 252/412 |

*Primary Examiner*—P. E. Konopka
*Attorney, Agent, or Firm*—Norman L. Balmer

[57] ABSTRACT

A spent catalyst comprising a zeolite base and an active metal such as a Group VIII noble metal is rejuvenated by contacting the catalyst with an aqueous solution containing urea.

10 Claims, No Drawings

UREA REJUVENATION OF CATALYSTS

This application is a continuation of prior U.S. application Ser. No. 642,747 filed 8/21/84, now abandoned which is a continuation of application Ser. No. 250,568 filed 4/3/81, abandoned.

This invention relates to rejuvenation of hydrocracking catalysts and their use in hydrocracking.

Hydrocracking is a process similar to catalytic cracking with hydrogenation superimposed; the reaction taking place either simultaneously or sequentially. The purpose of hydrocracking is to convert high boiling feedstocks to lower boiling products by cracking the feed hydrocarbons. Also polycyclic aromatics in the feed are partially hydrogenated to enable the cracking of the aromatic nucleus. The hydrocracking catalysts currently used generally comprise a highly acidic cracking component in conjunction with a noble metal or a combination of non-noble metals as a hydrogenation component.

Important factors contributing to catalytic activity are high surface area and fine dispersion of the hydrogenation component. Among suitable catalyst supports with high surface area are some of the crystalline zeolitic aluminosilicates. Generally a hydrogenation catalyst will comprise a Group VIII noble metal such as palladium or platinum as a hydrogenation component supported on a large-pore crystalline zeolitic aluminosilicate such as one of the forms of zeolite Type Y. Crystalline zeolitic aluminosilicates comprise a regular crystalline lattice structure that provides for molecular sieve properties and a larger surface area than amorphous forms of aluminosilicates. Both of these properties contribute to catalytic activity. It is, therefore, desirable that a catalyst comprising a zeolitic support not be subjected to conditions which would attack the crystal structure of the catalyst base and render it amorphous. A loss, of crystallinity as evidenced by X-ray examination, signifies at least partial destruction of the crystal lattice, a lowered surface area and, therefore, a lowered catalytic activity.

Zeolitic aluminosilicates used as hydrocracking catalyst supports also contain acidic sites that provide the cracking component of the catalyst. It is desirable that the above-mentioned hydrogenation component be finely dispersed and be in close association with this acidic cracking component. Fine dispersion of the hydrogenation component not only allows for efficient hydrogenation of the hydrocarbons being hydrocracked but also for effective hydrogenation of coke-precursors that lead to undesirable carbonaceous coke deposits. These deposits lead to a gradual deactivation of the catalyst as they accumulate. Efficient hydrogenation of the precursors makes it possible to operate the hydrocracking process for fairly long periods before there is an excessive accumulation of coke deposits.

Under conditions encountered in the hydrocracking processes, there is a gradual loss of catalyst activity resulting in a smaller conversion of the feed components. This loss can be compensated by raising the reaction temperature. However, as the reaction temperature rises there is an undesirable increase in light molecular-weight hydrocarbons in the product. Therefore, after a time the loss of activity is great enough such that the hydrocracking process must be shut down and the spent or deactivated catalyst replaced or restored substantially to its original activity.

The loss of activity is attributable in part to gradual formation of carbonaceous coke deposits as described above. Deactivation due to coke formation is largely reversible through oxidative regeneration, wherein the coke deposits are burned from the catalyst under controlled conditions to prevent high temperatures destructive to the zeolite base. Examples of oxidative regeneration processes are disclosed in U.S. Pat. No. 3,988,260 to W. W. Weber and D. F. Best which patent is hereby incorporated by reference.

Loss of catalyst activity is also due, to a significant extent, to agglomeration and migration of the finely-dispersed hydrogenation component. Under conditions encountered in hydrocracking processes and some oxidative regeneration processes, active metal or noble metal hydrogenation components tend to agglomerate. Additionally, the active metal or noble metals particles tend to migrate to positions less accessible for hydrogenation, i.e. to positions that interact less effectively with the acidic cracking sites of zeolitic base. This results in a degradation of catalytic activity that can be substantially restored by rejuvenation of the catalyst by redispersing the hydrogenation component.

A method effective for redispersing the hydrogenation component or for rejuvenation of some catalysts is to contact the catalyst with aqueous solutions containing ammonium hydroxide and/or ammonium salts to effect redisperal of the metal hydrogenation component. Examples of such methods are disclosed in U.S. Pat. Nos. 2,692,692 and 3,836,028, both to J. W. Ward and D. E. Clark, and 4,107,031 and 4,139,433, both to J. W. Ward.

Without being bound to a theory, it is thought that in these processes free ammonia ($NH_3$) is formed; this forms a complexed ionic species with the maldispersed and agglomerated metal hydrogenation component. These complexed ions, through an ion-exchange mechanism, migrate to ion-exchange sites on the zeolite to achieve a well dispersed state. A general characteristic of processes using ammonium hydroxide or an ammonium salt as the principal source of free ammonia is the high pH value of the solutions contacting the catalyst, typically near pH 10 or above. Under these high pH conditions the structure of crystalline zeolitic aluminosilicates are damaged and rendered at least partly amorphous. Processes, therefore, that inherently produce such high pH values are unsuitable for catalysts with a zeolitic component that tends to become unstable in highly basic solutions. The resultant loss in crystallinity, as explained above, adversely affects catalytic activity. Among these compositions, are some modified forms of zeolite Type Y used as catalyst bases.

It is, therefore, an object of the invention to provide a process for ammonical rejuvenation of catalysts wherein the pH can be maintained low enought, at about 9.5 or below, to prevent any substantial loss of crystallinity of these base-unstable zeolitic catalyst bases.

This and other objects that will be apparent from the specification are accomplished using a rejuvenation solution containing ureas as a principal source of free ammonia. As used hereinafter, base-unstable refers to zeolitic compositions unstable in or sensitive to pH solutions of high basicity usually about 10 or above, and base-stable refers to zeolitic compositions that are stable in the same solutions.

The rejuvenation agent used in the process of the invention, urea, sometimes called carbamide, is relatively inexpensive, and is colorless, odorless and tasteless at room temperature. It has heretofore been used in the hydrocarbon processing industry, but not as a rejuvenation agent as in the present invention. In water, urea hydrolyzes slowly to form ammonium carbamate and eventually, via the intermediate hydrolysis of cyanate anion, decomposes to free ammonia and carbon dioxide. The over-all hydrolysis reaction of urea to free ammonia is shown in Equation 1 below;

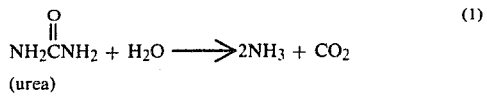

$$NH_2\overset{\overset{O}{\|}}{C}NH_2 + H_2O \longrightarrow 2NH_3 + CO_2 \quad (1)$$
(urea)

Generally the pH of aqueous solutions of urea is near neutral due to the equilibrium between the urea and the acidic $CO_2$ and basic $NH_3$ hydrolysis products. The properties of the urea-containing solutions, as contemplated by the invention, thereby provide for sufficient free ammonia for rejuvenation of the catalyst while allowing regulation of the pH to as low as 5. Although the process of the invention is particularly suited for base-unstable composition, it can be also used successfully for compositions stable at high pH values or base-stable zeolites. For rejuvenation of base-stable zeolites, pH regulation is unnecessary, and it is contemplated that the pH of the rejuvenation solution of the process of the invention may be as high as 11 for rejuvenation of base-stable compositions. For base-unstable compositions, however, pH regulation is necessary, and preferred range of pH is from 5.0 to 9.5 or more preferably from 8.0 to 9.5.

In solutions containing essentially only urea and water, the limiting pH is from about 8.0 to 8.5 as the concentration of urea rises. In high concentrations such as that used in Example 6 below (23 molar), this pH will limit the hydrolysis reaction and the formation of $NH_3$. Thus, the free ammonia concentration will not be significantly increased by using very high urea concentrations. For this reason when using urea solutions above about 17 molar, the rejuvenation process of the invention becomes somewhat less effective. The higher concentrations above about 17M are still usable and within the contemplation of the invention but do not provide significant improvement over results obtained at lower concentrations near 17M or below. Concentrations below 17M are, therefore preferred.

Thus a process is provided for the rejuvenation of a spent catalyst, said catalyst comprising a crystalline zeolitic aluminosilicate and a Group VIII noble metal hydrogenation component, which process comprises contacting said catalyst with an aqueous solution containing urea.

The catalyst composition may also contain other substances such as organic or inorganic binders, alumina, diluents, promoters and the like well known to the catalyst art. As mentioned above, any catalyst having a crystalline zeolitic aluminosilicate with the stability and catalytic properties suitable for hydrocracking service as the catalyst base and having a Group VIII noble metal hydrogenation component is suitable for treatment by the process of the invention. Examples of the base-stable zeolitic compositions include many having the zeolite Type Y crystal structure such as that disclosed in columns 5 and 6 of above-referenced U.S. Pat. No. 3,988,620 and also various other forms of zeolites having the "faujasite type" of structure. Others include but are not limited to mordenite and the so-called "family" identified as "ZSM-5 type" zeolites, which are well documented in the literature.

The base-unstable zeolite compositions, for which the present process is particularly suitable, include but are not limited to zeolite omega as described in U.S. Pat. No. 4,241,036 to E. M. Flanigen et al., zeolite L as described in U.S. Pat. No. 3,216,789 to D. W. Breck et al., zeolite Z-14 US as described in U.S. Pat. No. 3,293,192 to P. K. Maher et al., and the zeolite compositions described in U.K. Pat. No. 1,506,429 to D. F. Best et al.

The process of the invention provides a distinct advantage over the prior art for rejuvenation of catalysts containing the base-unstable zeolitic compositions, since the prior art processes are not suitably employed in treating these catalysts; the zeolite being rendered at least partly amorphous by the high pH conditions.

It is within the contemplation of the invention that ammonium hydroxide or ammonia salts may be added to the aqueous urea solution to also provide free ammonia in addition to that derived from the urea. The buffering action of the urea will still allow for lower pH values while providing sufficient free ammonia to effect redispersion of the hydrogenation component.

The pH may be further lowered by the addition of an acid that will not form insoluble salts in ammoniacal solutions, such as nitric acid. Thereby, suitable rejuvenation solutions with a pH as low as 5 can be obtained.

Temperature conditions are not highly critical as long as the temperature is high enough for the rejuvenation reaction to proceed. Higher temperatures near 100° C. have been shown to be the most effective for rejuvenation, although lower temperatures, as low as 70° or 80° C., are also suitable.

Generally the length of the treatment period is not critical although a sufficient time should be provided to allow sufficient redispersal of the hydrogenation component to an acceptable level. At solution temperatures of from 80° C. to about 100° C., six hours or more have been found suitable.

The Examples below illustrate the invention wherein urea is used and include in one instance a comparison with a conventional ammoniacal process wherein urea is not used. The description below of various zeolitic compositions and catalysts is intended only to illustrate examples of suitable compositions for rejuvenation by the process of the invention as demonstrated by the specific examples that follow, and is not intended as a limitation of the present invention.

In Examples 1-10 a catalyst comprising a base-unstable zeolite is used. This zeolite and a catalyst composition similar to that treated in Examples 1-10 is disclosed in above referenced British Pat. No. 1,506,429 to D. F. Best, A. P. Bolton and H. C. Shaw. The zeolites and processes relating to this reference and the catalysts containing those zeolites will herein after be designated by the notation "BBS." BBS catalyst have been used in commercial hydrocracking service for sufficient time that quantities have become deactivated or spent. Attempts to rejuvenate BBS catalysts at a pH of 10 encountered in conventional rejuvenation process have resulted in a loss of crystallinity of the BBS zeolite base. Since the BBS catalyst is degraded at pH values near 10, it is preferred to not expose BBS zeolite to a pH of greater than about 9.5. As explained above and illustrated below, the process of the invention is, therefore, particularly suited for rejuvenation of this zeolite and other base-unstable zeolite compositions.

BBS zeolite compositions are made by modifying a zeolite Type Y, which composition and a process for making the same are disclosed in U.S. Pat. No. 3,130,007 to D. W. Breck.

In the above-cited British Pat. No. 1,506,429, BBS catalysts are described as comprising a crystalline zeolitic aluminosilicate having a $SiO_2/Al_2O_3$ molar ratio of from 4.6 to 5.4, a face-centered cubic unit cell having an $a_o$ in the range of 24.45 to 24.55 Å, an $Na_2O/Al_2O_3$ molar ratio of not greater than 0.25, for example, of less than 0.038, an adsorptive capacity in the dehydrated state for oxygen of at least 26 weight-percent at 100 mm HG oxygen pressure and $-183°$ C., an ion-exchange capacity of from 0.15 to 0.35, as determined by the method hereinafter defined, and having the essential X-ray powder diffraction pattern of zeolite Y with the proviso that the d-spacing thereof having the Miller Indices 331 is at least as great in intensity as the d-spacing thereof having the Miller Indices 533. This proviso applies even when essentially all of the cations are sodium cations. For catalyst utilization, the sodium content of the BBS zeolite is preferably less than 0.5 weight-% as $Na_2O$ (anhydrous basis). By "anhydrous" is meant the condition of the zeolite after being fired in air at 1000° C. for 1 hour.

The essential X-ray pattern of zeolite Y referred to above is shown in Table A below. This pattern is obtained using standard X-ray powder diffraction techniques. The radiation source is a high-intensity, copper target X-ray tube operated at 50 Kv and 40 ma. The diffraction pattern from the copper K-alpha radiation and graphite monochromator is suitably recorded by an X-ray spectrometer with scintillation-counter, pulse-height analyzer and strip-chart recorder. Flat compressed powder samples are scanned at 2° (2 theta) per minute, using a 2-second time constant. Interplanar spacings (d) are obtained from Bragg angle (2 theta) positions of peaks as observed on the strip chart. Intensities are determined from the heights of diffraction peaks after subtracting background. The crystal symmetry is cubic. The Miller Indices and relative intensity of nine prominent d-spacings characteristic of zeolite Y are shown in the Table below.

TABLE A

| Miller Indices hkl | Intensity |
|---|---|
| 111 | very strong |
| 220 | medium |
| 311 | medium |
| 331 | strong |
| 333; 511 | medium |
| 440 | medium |
| 533 | strong |
| 642 | strong |
| 751; 555 | strong |

Thus, the X-ray diffraction pattern of the BBS zeolite materials will exhibit at least the d-spacings corresponding to the Miller Indices of Table A and can contain all of the other d-spacings permissible to the face centered cubic system with a unit cell edge of 24.51 to 24.55 Å defined by the lines of Table A. With regard to the aspect of the X-ray pattern of the BBS zeolites wherein the d-spacings corresponding to the Miller Indices 331 is at least as intensive as that corresponding to the Miller Indices 533, it should be noted that in the pattern of conventional zeolite Y, i.e., the sodium cation form, which has not been stabilized in accordance with the process for making a BBS zeolite, the d-spacing corresponding to the Miller Indices 331 is the less intense of the two aforesaid lines. Although the inversion of the d-spacing intensities is not unique to the pattern of the novel stabilized modified form of zeolite Y, i.e., certain cations such as $Mg^{+2}$ introduced into the crystal have been observed to cause the same alteration of d-spacing intensities, it nevertheless has been found that the desired degree of stability is not attained unless the preparative procedure is carried out in such a manner that the aforesaid d-spacing intensity inversion occurs even in the sodium cation form. It has further been found that in certain instances in which the preparative procedure was improperly carried out and the aforesaid d-spacing inversion was not exhibited by the sodium form of the zeolite product, exchange of some of the sodium cations by ammonium cations did not result in a product having the d-spacings properly inverted with respect to intensity. Such a product was not, however, stabilized sufficiently to be suitable for the use in a BBS catalyst composition. It is apparent, therefore, that the X-ray d-spacing inversion discussed above is not meaningful when considered alone, but when taken in conjunction with the other characteristics of the BBS zeolite compositions, does provide a useful means of distinguishing these compositions from others known in the art and also, as discussed hereinafter, serves as a guideline to proper preparative procedures.

For the determination of the oxygen capacity of the zeolite at 100 mm. Hg oxygen pressure and $-183°$ C., a procedure can be employed which results in a true value. The sample to be tested must be in a fully-dehydrated state and the environment from which the zeolite adsorbs oxygen should be essentially pure oxygen. It has been found that a conventional McBain apparatus is advantageous for this test procedure and that a pre-heating of the sample at a temperature of about 400° to 450° C. for 16 hours at a pressure maintained at 5 microns Hg or lower is an adequate preparation of the zeolite sample prior to the oxygen adsorption measurement.

As used herein and in the claims, the term "IEC" or "ion exchange capacity" is intended to designate, as the name implies, a measure of the number of active cation sites in the stabilized zeolite composition, at least in its as-prepared form. Since simple gravimetric analyses of zeolites can indicate only those cation sites occupied by metal or nitrogen-containing cations, to determine an IEC value of a BBS zeolite sample, the zeolite is initially contacted with an aqueous ion exchange solution of $NH_4Cl$ containing 25–30 wt.-% $NH_4Cl$. Conventional ion-exchange procedures are adequate for this purpose. Thereafter, the routine gravimetric analysis results are substituted in the formula $$IEC = k \left[ \frac{(NH_4)_2O + Na_2O}{SiO_2} \right]$$

wherein k is the $SiO_2/Al_2O_3$ molar ratio of the zeolite after stabilization as described above, but prior to any ammonium cation exchange thereof after stabilization, and $$\frac{(NH_4)_2O + Na_2O}{SiO_2}$$

is the ratio of the sum of moles of $(NH_4)_2O$ and $Na_2O$ per mole of $SiO_2$ of the zeolite after post-stabilization and ammonium cation exchange. The value of IEC can vary from 0.15 to 0.35, but is preferably in the range of 0.18 to 0.28.

The hydrolytic stability of the BBS zeolite compositions toward degradation by hydrothermal abuse is readily determined by the following procedure: The sample to be tested is first fully hydrated by allowing it to equilibrate in air at 25° C., having a relative humidity of 50 percent. The hydrated sample is then heated at 500° C. for 2 hours, cooled to 25° C. and again fully hydrated by equilibration in moist air as in the initial step. Thereafter, the sample is again heated to 500° C. for 2 hours and again cooled to room temperature. The retention of crystallinity, i.e., the stability of the zeolite, is judged by its oxygen adsorption capacity at $-183°$ C. and an oxygen pressure of 100 mm. Hg as described hereinbefore.

The process whereby the zeolite compositions are prepared for use in BBS catalysts comprises providing a cation-exchanged zeolite Y having following composition in terms of mole ratios of oxides, $$0.75-0.9(A)_2O:0.1-0.25Na_2O:Al_2O_3:4.6-5.4SiO_2 \cdot yH_2O,$$

wherein "A" represents H, $NH_4$ or a mixture thereof, and "y" has a value of 0 to 9, depending upon the degree of hydration, heating the zeolite at a temperature between 550° and 800° C. for a period of at least 0.25 hours in an inert atmosphere comprising sufficient steam content to prevent dehydroxylation of the zeolite, removing at least a major proportion, preferably all, of any ammonia generated by the heated zeolite from contact with the zeolite, and cooling the steamed zeolite to a temperature below 350° C., preferably below 300° C., at a rate sufficiently rapid that the cooled zeolite exhibits an X-ray pattern having the d-spacing corresponding to the Miller Indices of 331 at least as strong in intensity as that corresponding to the Miller Indices 533 prior to any post-steaming ion exchange treatment.

The preferred starting material is the form of the zeolite defined in the immediately-preceding paragraph in which the term $(A)_2O$ represents $(NH_4)_2O$. This material is readily prepared by conventional ion exchange techniques in which an aqueous solution of an ionizable ammonium salt is contacted with sodium zeolite Y crystals. The necessary degree of cation exchange can be accomplished in a single ion-exchange step, but two or more exchange treatments can be utilized if desired. Dehydroxylation, i.e., decationization, of the zeolite starting material prior to treatment, in accordance with the process of making the BBS zeolite, is to be avoided since it leads to substantial loss of crystallinity in the final product. Accordingly, since in air the temperature required for deammination of an ammonium cation-containing zeolite also causes some dehydroxylation thereof, it is advantageous to maintain the temperature of any starting zeolite below 250° F. when the zeolite contains ammonium cations. It further follows that extensive thermal deammination in air of an ammonium cation-exchanged sodium zeolite Y to produce the corresponding hydrogen form is not a feasible procedure for making a BBS zeolite. The hydrogen form is, however, readily prepared using a conventional cation-exchange procedure using an aqueous solution containing a high $H^+$ ion concentration, such as provided by a sulfuric, acetic or hydrochloric acid solution. It will be understood that when acid treatment of a metal-cation form of zeolite Y is employed to obtain the starting material for the process, some removal of aluminum from the zeolite is possible which may result in final products somewhat higher in $SiO_2/Al_2O_3$ molar ratio than when an ammonium cation form of zeolite is used as the starting material. The increase, within reason, in $SiO_2/Al_2O_3$ ratio is not harmful to the properties of the final product.

The rate of heating from ambient room temperatures to a temperature of between 550° and 800° C. is not a critical factor provided that sufficient steam is present to prevent dehydroxylation. This is also true for the time period during which the zeolite is held within the temperature range of 550° to 800° C. The period of at least 15 minutes as provided above for the steaming treatment is based more on practical considerations concerning commercial scale operation than on purely technical grounds. Regardless of the other transformations occurring in the zeolite crystal during the steaming operation, it is essential that the ammonium cations be decomposed and the resulting ammonia be permitted time to diffuse from the internal cavities of the crystal lattice and be substantially removed from the zeolite environment to avoid recontact during cool-down.

It has been observed that the time period which can be allowed for cooling the steamed zeolite to below 350° C. varies considerably with the relative presence of ammonia and/or water in the cooling atmosphere. In dry air, for example, as long as 19 minutes have been used to cool the steamed zeolite from 600° C. to below 300° C. with the retention of excellent stability and activity by the zeolite. In the presence of steam, cool-down periods of as long as 10 minutes have been noted to result in a zeolite product less stable than that which is easily obtained by proper cool-down. The presence of only small quantities of ammonia in the cool-down atmosphere, particularly in the additional presence of water vapor, has a relatively severe adverse affect on the properties of the zeolite. Accordingly, ammonia should be excluded insofar as possible. For any given environment, however, a routine test of sufficient cooling rate is the determination of whether or not the product zeolite exhibits a relative inversion of the X-ray peak heights corresponding to Miller Indices of 331 and 553 from the peak heights normally present in the X-ray pattern of sodium zeolite Y or the ammonium-exchanged starting material of the process for making a BBS composition.

The sodium content of the starting zeolite is from 0.1 to 0.25 inclusive, preferably from 0.1 to 0.20, moles $Na_2O$ per mole of $Al_2O_3$ and the steaming and quenching procedure does not change this sodium content. Nevertheless, in its dehydrated state, the product of the process for making BBS zeolites, is a highly active and stable catalyst base for hydrocarbon conversion processes. The product is also catalytically active in its hydrated or partially hydrated form. It is found moreover that replacement with other metallic cations, such as magnesium, does not significantly increase the activity of the catalyst base. A reduction of the sodium content, essentially to zero is desired, but preferably at least to less than 0.5 wt.%, as $Na_2O$, (anhydrous basis), is attainable by resort to one or a series of two or more ion exchange treatments using aqueous solutions of mineral acids (pH 2-5) or ammonium salts such as NH$_4$Cl or NH$_4$NO$_3$ in the conventional manner. For example, sufficient sodium cations may be replaced to lower the Na$_2$O/Al$_2$O$_3$ molar ratio to less than 0.038.

The hydrogenation component in a BBS catalyst can be supplied through ion exchange with solutions containing the desired Group VIII noble metal. Example A below shows how a BBS catalyst suitable for rejuvenation by the process of the invention can be made. This example is only used to illustrate the composition used in Examples 1 to 10, the composition being only one of a class of compositions contemplated for rejuvenation by the process of the invention as described in the claims.

In the Examples 1–10 below, the BBS catalyst contained palladium as the Group VIII noble metal hydrogenation component. Illustrated in Example A is how a BBS zeolite can be made and how a BBS catalyst can be made therefrom. The catalyst illustrated is similar to the catalyst treated in Examples 1 to 10 and for purposes of this disclosure can be regarded as the same.

EXAMPLE A (a) A sample of air-dried ammonium exchanged-type Y zeolite having a composition, exclusive of water of hydration:

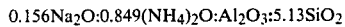

$$0.156Na_2O:0.849(NH_4)_2O:Al_2O_3:5.13SiO_2$$

was tableted into ½"-diameter slugs and charged to a Vycor tube provided with an external heating means. "Vycor" is a trademark. Over a period of 0.25 hours, the temperature of the charge was raised to 600° C. and thereafter maintained at this temperature for one hour. During this 1.25 hour period, steam generated from demineralized water was passed upward through the charge in the tube at a rate of 0.1 to 0.6 pounds per hour. Ammonia gas generated during the heating by deammination of the zeolite was passed from the system continually. At the termination of the heating period the steam flow through the tube was stopped and the temperature of the charge in the tube was lowered over a period of about 5 minutes in air to ambient room temperature. The X-ray pattern of the product corresponded to that of Table A hereinbefore and exhibited a greater intensity for the d-spacing corresponding to the Miller Indices (331) than for the d-spacing corresponding to (533). (b) The stabilized zeolite of part (a) was subjected to a series of four cation exchange treatments using an aqueous solution of NH$_4$Cl (30 wt-%) at reflux. Chemical analyses of the same at the end of the fourth exchange treatment showed that the IEC was 0.25, the SiO$_2$/Al$_2$O$_3$ molar ratio was 5.2, the Na$_2$O content was 0.13 weight-%, the cubic unit cell edge, $a_o$, was 24.52 Å, and the oxygen capacity (100 mm oxygen pressure at -183° C.) was 29.4 weight-%. (c) A sample of a stabilized zeolite as prepared in accordance with parts (a) and (b) was cation-exchanged using an aqueous solution of palladium tetramine cation in sufficient amount to introduce 0.67 weight percent palladium as metal into the zeolite on a solids basis. The exchanged zeolite was then combined with fine-particle boehmite in a weight ratio of 3 parts zeolite to 1 part boehmite on a dry solids basis, plus sufficient water to form a plastic extrudable mass. After mix-mulling to uniform consistency, the mix was formed into ⅛" diameter extrudate product, these pieces averaging about 5/16" in length. The extrudate was dried at 100° C. for 16 hours, fired in a calcination oven and activated, in situ in a hydrocracking test reactor at 1500 psig hydrogen at 700° F. The resulting composition was a BBS catalyst.

In order to evaluate the effectiveness of the rejuvenation process of the invention, hydrocracking tests were run to simulate each stage of a two-stage hydrocracking process by reacting a simulated feed in a test reactor. In these tests, for both first- and second-stage simulations, a gas oil boiling from about 345° F. to 850° F. with an API gravity of 34.1° was used as a feed into a hydrocracking test reactor containing the catalyst to be tested. For the first-stage simulations, the feed was "doped" by adding thiophene to give about 0.5 weight-percent sulfur and by adding t-butylamine to give about 0.2 weight percent nitrogen. For the second-stage simulations, thiophene was added to give about 0.5 weight-percent sulfur. In the hydrocracking processes here contemplated, the second-stage feed is nitrogen-free. Therefore, no nitrogen composition was added to the feed of the simulated second stage. Sulfur and nitrogen reversibly poison the catalyst, requiring a higher conversion temperature than that required by feeds free of nitrogen and sulfur. For simulation tests for both stages, the pressure was 1400 psig, the liquid-hourly space-velocity (LHSV) was 1.7 and the hydrogen was supplied at 8000 SCF per barrel of feed.

The catalytic activity was determined by finding the activity temperature required to yield a product having 47° API for the first stage and 49.5 API for the second stage, after 100 hours of simulated hydrocracking operation.

A hydrocracking test was done with a fresh reference catalyst of the same type as the catalyst samples rejuvenated in the examples. From the activity temperatures the "delta-values", or the difference between the activity temperatures of rejuvenated catalysts and that of the reference, are determined. The delta-value is a measure of the activity of a test catalyst in relation to the reference catalyst. A lower delta-value indicates a better activity. The second-stage delta-value is principally a function of the condition of the hydrogenation component and is, therefore, a measure of the effectiveness of the rejuvenation. For Examples 1-10 below, the activity temperatures of the reference catalyst for the first and second stage were 681° F. and 490° F. respectively. The surface area of the reference was 641 m$^2$/g and it contained 0.532 weight percent palladium. The rejuvenated catalysts were also evaluated by measuring the surface area and by measuring the crystallinity by X-ray diffraction.

The surface areas were obtained using the B-E-T method described by Brunauer et al. in *J.Am. Chem. Soc.* 60,390 (1938). The X-ray diffraction patterns were made as described above.

The following Examples 1 to 4, 6 and 8 to 10 illustrate the present invention. The BBS catalysts were sampled from large quantities of coked material from four hydrocracking installations. These catalysts had become substantially deactivated from coke deposits and palladium maldistribution due to a long period in commercial hydrocracking service. The general procedure for rejuvenation in the following Examples 1 to 6 and 8 to 10, is to add the indicated amount of catalyst to a three-necked two-liter flask fitted with a heating mantle, a water condenser, mechanical stirrer and temperature controller. The height of the stirring paddle is adjusted and the urea solution is added. This mixture is heated to the indicated temperature and the solution was agitated for 6 hours at that temperature. In cases where $NH_3$ was added as $NH_4OH$, the latter is added at 2, 4 and 5 hours. In these cases 0.12 milliliters of 14.8 molar $NH_4OH$ were added per gram catalyst at 2, 4 and 5 hours. At the end of 6 hours the catalyst mass is separated from the liquid by decantation and washed with distilled water. The wet catalyst is dried at about 100° C. and calcined at about 480° C. subjected to a post-hydration yielding a product with about 5 to 6 weight-percent $H_2O$.

Table I summarizes data relating to the examples below. The "Initial Surface Area" was measured before the rejuvenation process after oxidative regeneration. The "Final Surface Area" was measured after rejuvenation. The star denotes addition of $NH_4OH$ to the aqueous urea solution as described above. In Examples 1 and 2, the catalyst was first regenerated in a box oven to remove the coke deposits. In Examples 3 to 6 and 8 to 10, a rotary kiln method as disclosed in the above referenced U.S. Pat. No. 3,988,260, was used for regeneration. The sample of comparative Example 7 was regenerated in air in a conventional laboratory oven. There appears to be no effect of the regeneration method on catalyst activity when the regenerated catalysts are thereafter rejuvenated by the process of the invention. Any regeneration method that suitably removes the coke deposits and retains the crystallinity of the zeolite base would be suitable for use in conjunction with the process of the invention. However, the preferred regeneration process to be used with the rejuvenation process of the instant invention is the claimed regeneration process of the above referenced U.S. Pat. No. 3,988,260 wherein catalyst compositions having accumulated carbonaceous coke deposits are reacted in the presence of particles of an inert refractory material in a rotary kiln.

EXAMPLES 1 TO 6

These examples show the effect of different urea concentrations and the effect of addition of $NH_3$ in the form of $NH_4OH$. The solution temperature was 80° C. The higher second-stage delta value for Example 1 as shown in Table I probably indicates an incomplete redispersal of the palladium hydrogenation component. In Example 5, the pH after addition of the $NH_4OH$ climbed above 10. Since the BBS composition rejuvinated in Example 5 was base-unstable, the higher second-stage delta-value of Example 5 is, therefore most likely attributable to a partial loss of crystallinity due to the high pH conditions. Thus, this example does not show the preferred practice of the invention for treatment of base-unstable composition. Preferably, the pH is maintained at a lower value harmless to base-unstable compositions. Other examples herein included demonstrate how the pH can be controlled and still provide for effective rejuvenation. Example 4 which exhibited a second-stage delta-value of 15° F. is particularly favorable. Examples 2 to 4 and 6 all show second stage delta-values that are adequate from a commerical standpoint and represent suitable rejuvenation of the base-unstable BBS catalyst.

EXAMPLE 7

This example does not represent practice of the present invention. Instead, it demonstrates that prior art or other conventional rejuvenation procedures using only $NH_4OH$ and ammonium salts are not applicable to the BBS catalyst material in use here.

A 200-gram sample of coked "BBS" catalyst (returned from a commercial hydrocracking installation), which had been regenerated in a laboratory oven, was contacted with a mixture of water, ammonium hydroxide and ammonium carbonate. This combined mixture was refluxed in a 2-liter 3-necked flask with stirring for 6 hours at 85°–90° C. During this time, ammonium hydroxide was added as in the above Examples at 2, 4 and 5 hours. At the end of 6 hours the reaction was stopped. The catalyst bodies were separated from the treating solution and washed with distilled water. This material was dried overnight at 100° C. and activated at 480° C. A sample submitted for X-ray analysis was subsequently found to be amorphous. The surface area of the treated material was determined to be 318 $m^2$/gram. This material was accordingly judged as obviously not suitable for testing of hydrocracking activity.

Other attempts were made to rejuvenate BBS catalyst by conventional ammoniacal treatment. In one test the pH of the treating solution was 10.1 No activity tests were made, since X-ray diffraction analysis indicated the material was amorphous.

Comparison of the pH values encountered in the practice of the invention as shown in Table I and the high pH encountered here illustrates how the pH may be advantageously regulated by practice of the invention to prevent damage to zeolitic bases sensitive to high pH.

EXAMPLE 8

Using the general procedure described above, a quantity of coked refinery BBS catalyst regenerated in a rotary kiln at 600° C. was rejuvenated with a 17M urea solution at 80° C. The additional step here was the slow addition of 1M nitric acid solution to the reaction vessel to maintain a pH of 5 to 6 for the entire reaction period. Examination of the rejuvenated product showed that crystallinity and surface area were retained.

The second-stage delta value was found to be 18° F., which compares favorably with the other examples. This demonstrates how pH can be further regulated by the addition of acid. Rejuvenation at a lower pH is possible here because the properties of urea solutions provide sufficient free $NH_3$ for rejuvenation even in acidic solutions.

EXAMPLES 9 TO 10

These examples were carried out in a similar manner as Example 1 to 6 above, except that the solution temperature was 100° C. The sample of Example 10 was measured after 200 hours of simulated hydrocracking operation. The activity temperature at 200 hours would be expected to be slightly higher than at 100 hours. Therefore, a comparative Δ-value at 100 hours would probably be lower. The second-stage delta-values for these examples show further improvement over the favorable results of earlier Examples 1–4 and 6. These results illustrate that the effectiveness of the rejuvenation is greater at a solution temperature of about 100° C. as opposed to 80° C.

EXAMPLE 11

This example illustrates rejuvenation of a base-stable catalyst composition. The base-stable zeolitic composition used is a stabilized zeolite type Y and is a member of the general class of compositions as described in U.S. Pat. No. 3,379,206 to H. C. Shaw. In general these zeolitic compositions are prepared by (a) providing a zeolite Type Y having a $SiO_2/Al_2O_3$ ratio of between about 3.5 and 6, (b) contacting the zeolite Type Y with an aqueous solution containing sufficient ammonium cations for ion-exchange to provide a $M_2O/Al_2O_3$ molar ratio of less than 0.15 where M is an alkali metal cation, and (c) thereafter contacting the zeolite Type Y with an aqueous solution containing sufficient magnesium cations for ion-exchange so that at least 25 percent of the aluminum atoms become associated with said magnesium cations.

The resulting product is then loaded by ion-exchange techniques with from about 0.2 to 2.0 weight percent palladium, tableted, usually with a binder such as alumina, and fired to a temperature above about 350° C. to form a catalyst. These catalysts are commonly used in commercial service. The zeolitic catalyst base as used in this example is substantially equivalent to that prepared by exchanging a sodium zeolite Type Y having a $SiO_2/Al_2O_3$ molar ratio of about 4.8 with ammonium cations to a degree of about 85 equivalent percent. Thereafter, the zeolite is backexchanged with about 40 equivalent percent magnesium cations and then the zeolite is loaded with about 0.5 weight percent palladium by ion-exchange technique using $Pd(NH_3)_4Cl_2$. The zeolite is tableted with about 20 weight percent alumina and fired at about 520° C. for ¾ hours.

Tests were run in a hydrocracking test reactor in the same manner as described above using a catalyst composition as prepared above. The catalyst tested was a catalyst which had become substantially deactivated due to a long period in hydrocracking service. Tests were also run on a fresh catalyst of the same type as a reference. The feeds were of a similar gas oil as used above and were doped with nitrogen and sulfer as described above in Example 1–10 to give 0.5 weight percent sulfer and 0.2 percent nitrogen for the first stage and 0.5 weight percent sulfer for the second stage. The first and second temperatures were those required to form a product having 470° API and a 49.5° API product respectively. The pressure was 1450 psig, the LHSV was 1.7 hr.$^{-1}$ and the hydrogen was supplied at 800 SCF per barrel of feed. The same general rejuvenation procedure as in the above examples 1–6 and 8–10 was used. The results are summarized on Table I. The first and second stage activity temperatures for the reference were 714° F. after 200 hr. and 544° F., after 100 hr. respectively. The low second stage delta-value of 3° F. demonstrates the effectiveness of the process of the invention in rejuvenating a common base-stable zeolitic catalyst. As described above, treatment of deactivated catalyst of other zeolitic bases would show similar results.

TABLE I

| Example | Initial Surface Area, (m²/g) | Urea Treatment Urea:Catalyst Wt. Ratio | Urea Treatment Wt. of Catalyst (grams) | Urea Treatment Urea Concn. (Molar) | Wt. % Pd | Final Surface Area, (m²/g) | Delta-Value (°F.) First Stage | Delta-Value (°F.) Second Stage | Solution pH |
|---|---|---|---|---|---|---|---|---|---|
| 1 | 494 | 1:1 | 100 | 6 | 0.50 | 471 | — | 49 | — |
| 2 | — | 1:1 | 100 | 6* | 0.51 | 493 | — | 21 | 8.9 |
| 3 | 500 | 1:1 | 100 | 6* | 0.53 | 472 | 1 | 18 | 9.5 |
| 4 | 500 | 3:1 | 100 | 17 | 0.50 | 523 | −4 | 15 | 9.2 |
| 5 | 502 | 3:1 | 200 | 17* | 0.55 | 485 | 13 | 28 | 10.3 |
| 6 | 502 | 7:1 | 200 | 23 | 0.52 | 499 | 0 | 20 | 8.4 |
| 7 | 497 | — | 200 | — | 0.51 | 318 | — | — | 10.2 |
| 8 | 525 | 3:1 | 200 | 17 | 0.51 | 672 | −10 | 18 | 5–6 |
| 9 | 525 | 3:1 | 100 | 17 | 0.55 | 519 | 0 | 4 | — |
| 10 | 525 | 3:1 | 100 | 10 | 0.53 | 559 | — | 10+ | 9.4 |
| 11 | — | 5:1 | 200 | 17 | 0.42 | — | −14+ | 3 | — |

Examples 1–10 were base-unstable compositions, Example 11 was a base-stable composition
Example of conventional rejuvenation practice employing $NH_4OH$ and ammonium salts.
*$NH_4OH$ added to the solution
+ After 200 hours

What is claimed is:

1. A process for the rejuvenation of a spent hydrocracking catalyst from a hydrocracking process, said hydrocracking catalyst comprising a base-unstable crystalline zeolitic aluminosilicate and a Group VIII noble metal hydrogenation component, which process comprises contacting said spent hydrocracking catalyst with an aqueous solution containing urea at a pH from about 5 to 9.5 and at a temperature high enough for the rejuvenation reaction to proceed wherein said temperature is between about 70° C. and about 100° C.

2. The process of claim 1 wherein said aqueous solution contains urea, and one or more members from the group consisting of ammonium hydroxide and ammonium salts.

3. The process of claim 1 wherein said aqueous solution contains urea and nitric acid.

4. The process of claim 1 wherein said crystalline zeolitic aluminosilicate has a $SiO_2/Al_2O_3$ molar ratio of from 4.6 to 5.4, a face-centered cubic unit cell having an $a_o$ of greater than 24.45 to 24.55 Å, an $Na_2O/Al_2O_3$ molar ratio of not greater than 0.25, an adsorptive capacity in the dehydrated state for oxygen of at least 26 weight-percent at 100 mm Hg oxygen pressure and −183° C., an ion-exchange capacity of from 0.15 to 0.35, and having the essential X-ray powder diffraction pattern of zeolite Y with the proviso that the d-spacing thereof having the Miller Indices 331 is at least as great in intensity as the d-spacing thereof having the Miller Indices 533.

5. The process of claim 4 wherein the pH of said aqueous solution is from about 8 to 9.5.

6. The process of claim 1 wherein said crystalline zeolitic aluminosilicate is a zeolite Type Y.

7. The process of claim 1 wherein said crystalline zeolitic aluminosilicate is made by the process which comprises; (a) providing a zeolite type Y having a $SiO_2/Al_2O_3$ molar ratio of between about 3.6 and 6, (b) contacting said zeolite Type Y with an aqueous solution containing sufficient ammonium cations for the ion-exchange to provide a $M_2O/Al_2O_3$ molar ratio of less than 0.15 where M is an alkali metal cation, and (c) thereafter contacting said zeolite Type Y with an aqueous solution containing sufficient magnesium cations for ion-exchange so that at least 25 percent of the aluminum atoms become associated with said magnesium cations.

8. The process of claim 1 wherein the said crystalline zeolitic aluminosilicate is made by a process which comprises; (a) providing a sodium zeolite Type Y having a $SiO_2/Al_2O_3$ molar ratio of about 4.8 (b) exchange said sodium zeolite Type Y with ammonium cations to a degree of about 85 equivalent percent, and (c) back-exchanging the product of step (b) with about 40 equivalent percent magnesium cations.

9. The process of claim 1 wherein the temperature is between about 80° C. and about 100° C.

10. A process for the rejuvenation of a spent hydrocracking catalyst said hydrocracking catalyst comprising a base-unstable crystalline zeolitic aluminosilicate and a Group VIII noble metal hydrogenation component, which comprises:

(a) regenerate said spent hydrocracking catalyst under an oxidative regeneration to burn coke deposits;

(b) contacting said regenerated hydrocracking catalyst of part (a) with an aqueous solution containing urea at a pH from about 5 to 9.5 and a temperature between about 70° C. and about 100° C.

* * * * *